United States Patent
Müller et al.

(10) Patent No.: US 12,172,238 B2
(45) Date of Patent: Dec. 24, 2024

(54) SOLDERING TIP ASSEMBLY FOR AN ELECTRIC SOLDERING DEVICE, IN PARTICULAR A SOLDERING IRON, SOLDERING DEVICE, AND SOLDERING SYSTEM

(71) Applicant: ERSA GmbH, Wertheim (DE)

(72) Inventors: Elmar Müller, Dorfprozelten (DE); Peter Zimmermann, Aschaffenburg (DE); Thorsten Issler, Bütthard (DE)

(73) Assignee: ERSA GmbH, Wertheim (DE)

( * ) Notice: Subject to any disclaimer, the term of this patent is extended or adjusted under 35 U.S.C. 154(b) by 0 days.

(21) Appl. No.: 18/037,258

(22) PCT Filed: Nov. 9, 2021

(86) PCT No.: PCT/EP2021/081071
§ 371 (c)(1),
(2) Date: May 16, 2023

(87) PCT Pub. No.: WO2022/106258
PCT Pub. Date: May 27, 2022

(65) Prior Publication Data
US 2024/0001471 A1   Jan. 4, 2024

(30) Foreign Application Priority Data
Nov. 18, 2020   (DE) ..................... 10 2020 130 464.1

(51) Int. Cl.
*B23K 3/00*   (2006.01)
*B23K 3/02*   (2006.01)
*B23K 3/03*   (2006.01)

(52) U.S. Cl.
CPC ............ *B23K 3/0369* (2013.01); *B23K 3/026* (2013.01); *B23K 3/027* (2013.01)

(58) Field of Classification Search
CPC ............................................... B23K 3/02–0392
(Continued)

(56) References Cited

U.S. PATENT DOCUMENTS

| 4,940,178 | A |   | 7/1990 | Hombrecher |            |
|-----------|---|---|--------|------------|------------|
| 5,025,973 | A | * | 6/1991 | Newton     | B23K 3/08  |
|           |   |   |        |            | 228/55     |

(Continued)

FOREIGN PATENT DOCUMENTS

| CN | 201586811 U | * | 9/2010 | ............. B23K 3/027 |
| CN | 203108836 U | * | 8/2013 | |

(Continued)

OTHER PUBLICATIONS

Machine translation of DE8214042U1 (no date available).*
(Continued)

*Primary Examiner* — Kiley S Stoner
(74) *Attorney, Agent, or Firm* — BOND, SCHOENECK & KING, PLLC; George R. McGuire (57) ABSTRACT

The invention relates to a soldering tip assembly for an electric soldering device, in particular a soldering iron. The soldering tip assembly is designed to be releasably arranged on a soldering device handle which has a heating element, and the soldering tip assembly has a sleeve with a soldering tip provided on the distal end of the sleeve. The sleeve has an opening at the proximal end for introducing the heating element, wherein a holding element which at least partially surrounds the sleeve in an annular manner and a spring element which is provided between the holding element and the sleeve are provided, the spring element pushing the holding element in the distal direction. The sleeve has at least one stop arranged distally from the spring element. The stop secures the holding element against the soldering tip assembly in the distal direction.

17 Claims, 5 Drawing Sheets

(58) Field of Classification Search
USPC .................................................. 228/51–55
See application file for complete search history.

(56) References Cited

U.S. PATENT DOCUMENTS

| | | | | |
|---|---|---|---|---|
| 6,563,087 | B1 * | 5/2003 | Yokoyama | ............ B23K 3/033 219/490 |
| 10,716,220 | B2 | 7/2020 | Nguyen | |
| 2008/0179309 | A1 * | 7/2008 | Markovsky | ............ B23K 3/026 219/229 |
| 2013/0270324 | A1 | 10/2013 | Miyazaki et al. | |
| 2019/0099885 | A1 * | 4/2019 | Teraoka | ................ B23K 1/16 |
| 2019/0126376 | A1 | 5/2019 | Niedermayer et al. | |
| 2020/0130085 | A1 * | 4/2020 | Miyazaki | ................. B23K 3/08 |

FOREIGN PATENT DOCUMENTS

| | | | | |
|---|---|---|---|---|
| CN | 103920961 | A * | 7/2014 | ............ B23K 3/00 |
| CN | 108637419 | A * | 10/2018 | ............ B23K 3/03 |
| CN | 109570679 | A * | 4/2019 | ............ B23K 3/02 |
| CN | 111112779 | A * | 5/2020 | ............ B23K 3/033 |
| CN | 211840504 | U | 11/2020 | |
| DE | 8214042 | U1 | 3/1983 | |
| DE | 202012008255 | U1 | 12/2013 | |
| DE | 102018102792 | B3 | 5/2019 | |
| EP | 2000244 | A1 | 12/2008 | |
| EP | 2181794 | A1 * | 5/2010 | ............ B23K 3/027 |
| EP | 2653255 | A1 | 10/2013 | |
| GB | 759851 | A | 10/1956 | |
| JP | 2005111496 | A * | 4/2005 | |
| JP | 2006026744 | A * | 2/2006 | .......... B23K 3/0323 |
| JP | 2013220477 | A | 10/2013 | |
| JP | 2020019025 | A | 2/2020 | |
| WO | 2017194261 | A1 | 11/2017 | |

OTHER PUBLICATIONS

International Search Report and Written Opinion of PCT/EP2021/081071, filed Nov. 9, 2021. Mailing date of Search Report Feb. 1, 2022. pp. 1-8.
Non-translated International Preliminary Report on Patentability, dated Nov. 6, 2022. pp. 1-7.
Translated Japanese Office Action, Application No. 2023-524908, dated Nov. 30, 2023, pp. 1-5.
Translated Spanish Office Action, App. No. 202390026, dated May 23, 2024, pp. 1-8.

* cited by examiner

Fig. 10

SOLDERING TIP ASSEMBLY FOR AN ELECTRIC SOLDERING DEVICE, IN PARTICULAR A SOLDERING IRON, SOLDERING DEVICE, AND SOLDERING SYSTEM

CROSS-REFERENCE TO RELATED APPLICATION

The present application is a U.S. National Stage application based on International Application PCT/EP2021/081071, filed Nov. 9, 2021, which claims priority to German Application No. 10 2020 130 464.1, filed Nov. 8, 2020, the entirety of each of which is hereby incorporated by reference.

BACKGROUND

The invention relates to a soldering tip assembly for an electric soldering device, in particular for a soldering iron, wherein the soldering tip assembly is designed to be releasably arranged on a soldering device handle which has a heating element, wherein the soldering tip assembly has a sleeve with a soldering tip provided on the distal end of the sleeve, wherein the sleeve has an opening at the proximal end for introducing the heating element, and wherein a holding element which at least partially surrounds the sleeve in an annular manner and a spring element which is provided between the holding element and the sleeve are provided, said spring element pushing the holding element in the distal direction.

Such a soldering tip assembly is known, for example, from the high-performance soldering iron i-TOOL HIGH POWER (item no.: 0240CDJ) of the applicant.

The soldering device can in particular be held and guided at the handle by a human person. By providing the heating element, the soldering tip is heated to melt solder. Soldering tips of different geometric shape are to be provided depending on the soldering task. The soldering tips are therefore releasably arranged on the handle. Screw connections, bayonet connections and latching systems are known in particular.

Such electric soldering devices are known from WO 2017/194261A1, DE 20 2012 008 255 U1 or DE 10 2018 102 792 B3.

EP 2 653 255 A1 discloses a soldering tip assembly for the releasable arrangement on a heating element, which assembly has a sleeve with a soldering tip provided on the distal end of the sleeve. At the proximal end, the sleeve has an opening for introducing the heating element.

SUMMARY OF THE INVENTION

The object of the present invention is to provide a soldering tip assembly, a soldering device and a soldering system which provides a temperature-resistant soldering tip that is interchangeable in a simple manner.

This object is achieved by an electric soldering device including a sleeve that has at least one stop means which is arranged distally from the spring element and secures the holding element in the distal direction against the soldering tip assembly or secures the sleeve in the proximal direction against the holding element. The sleeve can thus be captively arranged on the holding element, it nevertheless being displaceable in the proximal direction against the force of the spring element. The soldering tip can be formed as a separate component or in one part and/or integrally with the sleeve. Distally means away from the operator and proximally means toward the operator.

In particular when the soldering tip assembly is not arranged on the handle, the components that are arranged to be movable relative to one another are arranged captively relative to one another. Two stop means which are opposite one another, or three or more, can be provided in particular arranged equidistantly to one another. The sleeve can have recesses so as to prevent overheating of the sleeve and of the holding element arranged thereon, and so as to save material and thus weight. The at least one stop means can be provided in or adjoining such a recess. The holding element as such can have a conically tapering outer contour on which, for example, a parallel knurling can be provided.

It is advantageous if the at least one stop means projects beyond the sleeve in the radial direction. The portion projecting beyond the sleeve can then act against the holding element for loss protection.

The at least one stop means is preferably formed integrally with the sleeve and produced as a hook-out tongue. Such a hook-out tongue can be located in a recess of the sleeve, wherein a bending point is then provided on the tongue foot and wherein the free end of the hook-out tongue projecting in the proximal direction faces the holding element and acts against it for loss protection.

Furthermore, it is advantageous if the holding element is formed in one piece. This results in a compact long-lasting design.

In addition, the holding element can have a distal end face which is used to stop the stop means and is thus used as a stop limit of the sleeve. Additional stop means are then not required. The end face can provide radially inwardly directed shoulders which interact with the stop means.

Furthermore, it is conceivable that the holding element has a distal end face having a proximal inner face on which one end of the spring element is supported. This can also result in a compact design, in particular when the end face fulfills two functions: on the one hand, it can be used as a stop limit for the sleeve and on the other hand for supporting the spring element.

A further advantageous embodiment is that in the non-mounted state of the soldering tip assembly, the opening of the sleeve lies in the same plane as the proximal face of the holding element or that the opening of the sleeve projects beyond this plane in the proximal direction. This has the advantage that the heating element does not readily come into contact with the holding element when the heating element is introduced into the opening of the sleeve. When the heating element is introduced into the soldering tip assembly, it can be over 100° C., which can lead, in particular when there is contact with the holding element, to damage when it is formed from a plastics material.

The spring element as such is preferably designed as a coil spring surrounding the sleeve. The sleeve preferably sees at the proximal end a flange portion which surrounds the opening and protrudes in the radial direction and against which one end of the spring element acts.

The holding element can have a contact portion which is opposite the flange portion and against which the other end of the spring element acts. When the soldering tip assembly is not mounted on the handle, the holding element is consequently pushed in the distal direction against the at least one stop means and is thus captively fastened to the soldering tip assembly.

In order to axially guide the holding element on the sleeve, and in order to rotationally couple the holding element to the sleeve, the sleeve can have a guide contour and the holding element a counter contour complementary thereto. The guide contour can in particular be designed as a bead extending in the axial direction and raised in the radial direction. The sleeve can provide a recess designed so as to be complementary to the bead. Preferably, a plurality of such guide contours arranged in parallel with one another is provided.

For the functionally secure arrangement of the soldering tip assembly on the handle, the holding element has recesses on its proximal face which in particular at least partially extend in the axial direction. Rear grip portions are provided between the recesses, which portions provide contact portions on the distal faces thereof for resting against counter portions provided on the handle. As a result, a bayonet-like fastening of the soldering tip assembly to the handle can be achieved. First, the heating element is introduced into the soldering tip in the axial direction. During the introduction movement, the soldering tip together with the sleeve is moved by the heating element in the distal direction against the force of the spring element. The counter portions travel past the rear grip portions in the distal direction. When a sufficient compression of the spring element is reached, the handle together with the heating element can be rotated about the longitudinal axis by a rotation angle, such that the proximal faces of the counter portions interact with the contact portions of the rear grip portions. In the mounting position, the spring element then pushes the free end of the heating element against the soldering tip and the counter portions against the contact portions of the rear grip portions.

Furthermore, it is advantageous if a coding which can be read by means of in particular an optical reading device is provided on the holding element in order to identify the soldering tip. The coding is in particular a two-dimensional coding, for example in the form of a bar code or QR code. The coding can also be designed as an RFID code. The coding can be provided, for example, on a radially recessed surface of the holding element and can be printed, for example, with pad printing. In particular when the holding element is made of plastics material, a two-dimensional coding is particularly advantageous, because the plastics material does not change color even at higher temperatures. The pad printing can in particular be carried out with a white color in order to optimize the contrast to the plastics material used, which is preferably black or dark gray.

Providing such a coding has the advantage that it is possible to track which soldering tip is being used. For example, it is conceivable for the reading device to be provided on a deposit stand in which the soldering tips can be deposited. After receiving a soldering tip, it can be guided past the reading device such that which soldering tip is used can be stored. Furthermore, it is conceivable that, after selecting a suitable soldering tip, it is possible to check whether the selected soldering tip is actually the desired soldering tip. However, the reading device can also be provided as a separate unit or on a soldering station which supplies the soldering device with electrical energy.

By means of a recessed arrangement of the coding on the radially recessed surface, the coding is permanently protected against abrasion and further environmental influences. Overall, a permanent readability of the coding is thereby ensured. Each type of a soldering tip assembly is assigned a separate coding such that the identification of the soldering tip assembly is unambiguous. The information detected by the reading device can be further processed by means of software. The read data can be structured and displayed in readable form for a user. It is also conceivable for the data to be machined by means of a database software or an IVIES (manufacturing execution system), in particular also for process monitoring. A specific soldering tip can thus be assigned to a specific soldering task, and this is brought to the user's knowledge and also checked.

The aforementioned object is also achieved by an electric soldering device, comprising a soldering tip assembly according to the invention and comprising a handle which has a rod-shaped heating element at its distal end and a handheld portion at its proximal end such that the distal end of the heating element can be introduced into the opening of the sleeve. A soldering tip assembly according to the invention can, as described, advantageously be fastened to the handle in a functionally secure manner.

The handle can have, between the heating element and the handheld portion in particular rib-like counter portions which interact with the rear grip portions such that in the mounted state the spring element strikes the holding element against the counter portions and such that the free end of the heating element acts against a stop portion of the soldering tip. The proximal end of the soldering tip can be formed like a blind hole, wherein the contact portion is then formed by the bottom of the blind hole.

The aforementioned object is further achieved by a soldering system comprising a soldering device according to the invention with a soldering tip assembly according to the invention and a deposit stand for depositing and removing the soldering tip assembly. A reading device for reading a coding optionally provided on the holder element can be provided in or on the deposit stand.

Further details and advantageous embodiments of the invention can be found in the following description, on the basis of which an exemplary embodiment of the invention is described and explained in more detail.

DETAILED DESCRIPTION

Figure 1:
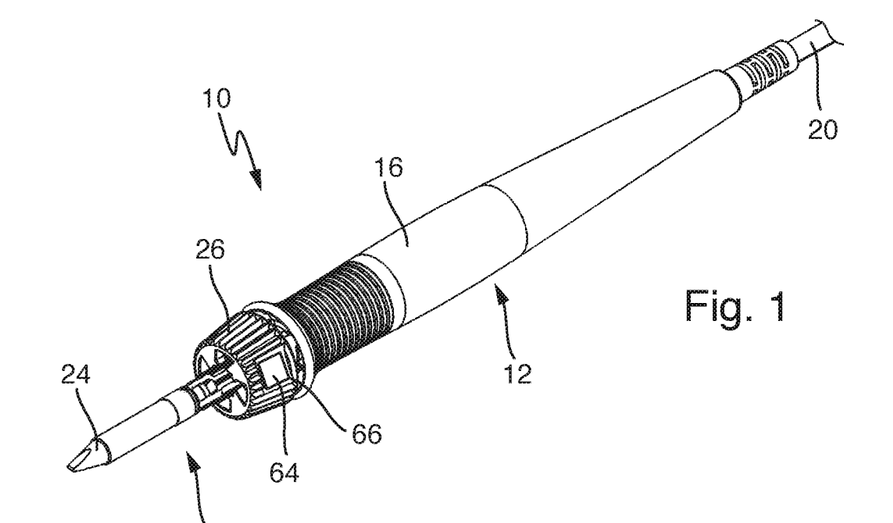
FIG. 1 shows a soldering device with a handle and a soldering tip assembly mounted thereon.
Figure 2:
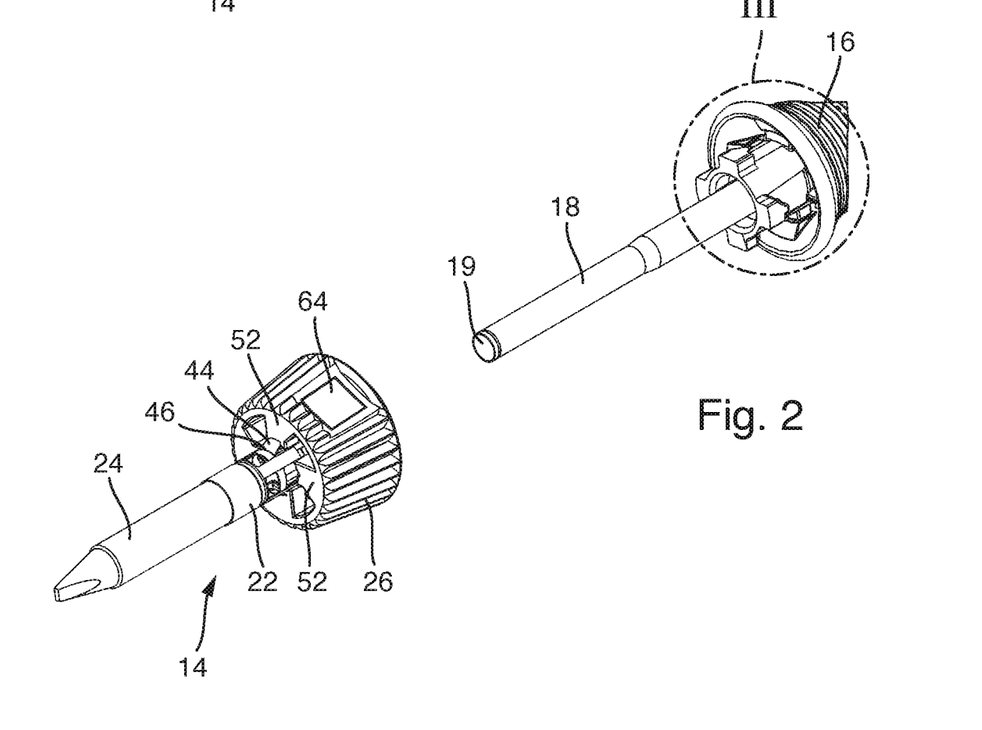
FIG. 2 shows the soldering tip assembly according to FIG. 1 released from the handle.

FIG. 1 shows a soldering device 10 in the form of a soldering iron which comprises a handle 12 and a soldering tip assembly 14. At its proximal end, the handle 12 comprises a handheld portion 16, which can be gripped by a user. The handle 12 further comprises, as is clear from FIG. 2, a rod-shaped heating element 18 with a free end 19 on its distal end, wherein the replaceable soldering tip assembly 14 is eventually heated with the heating element 18. On the face of the handheld portion 16 facing away from the heating element 18, as is clear from FIG. 1, a connecting cable 20 is provided with which the soldering device 10 can be supplied with current.

As is clear from FIG. 2, 4, 5, 6, 7, 8, the soldering tip assembly 14 has a sleeve 22 on the distal end of which a soldering tip 24 is fastened. The sleeve 22 can have window-like recesses 21. In the embodiment shown in the figures, the soldering tip 24 is designed as a part formed separately from the sleeve 22, but it is also conceivable for the soldering tip 24 to be formed in one piece and/or integrally with the sleeve 22.

The soldering tip assembly 14 further provides a holding element 26, which is arranged around a longitudinal axis 23 and surrounds the sleeve 22 in an annular manner, and is designed to taper conically toward the soldering tip 24. On its surface, the holding element 26 has a parallel knurling formed by knurled projections 27. The holding element 26 is used to place the soldering tip assembly 14 on the handle 12 or to release it therefrom. While the soldering tip 24 and the sleeve 22 are made of a metal material, the holding element 26 is preferably made of a suitable plastics material.

Figure 3:
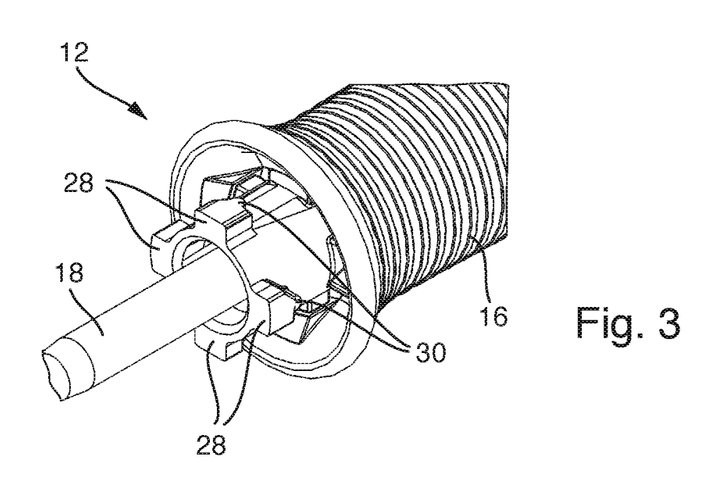
FIG. 3 is an enlarged view of the cut-out III in FIG. 2.

As is clear from the enlarged cut-out according to FIG. 3, the handle 12 has rib-like counter portions 28 in the region between the heating element 18 and the handheld portion 16. In total, four counter portions 28 are provided which are arranged opposite one another. The individual counter portions 28 have latching lugs 30 on the proximal face thereof, which extend in the axial direction.

Figure 4:
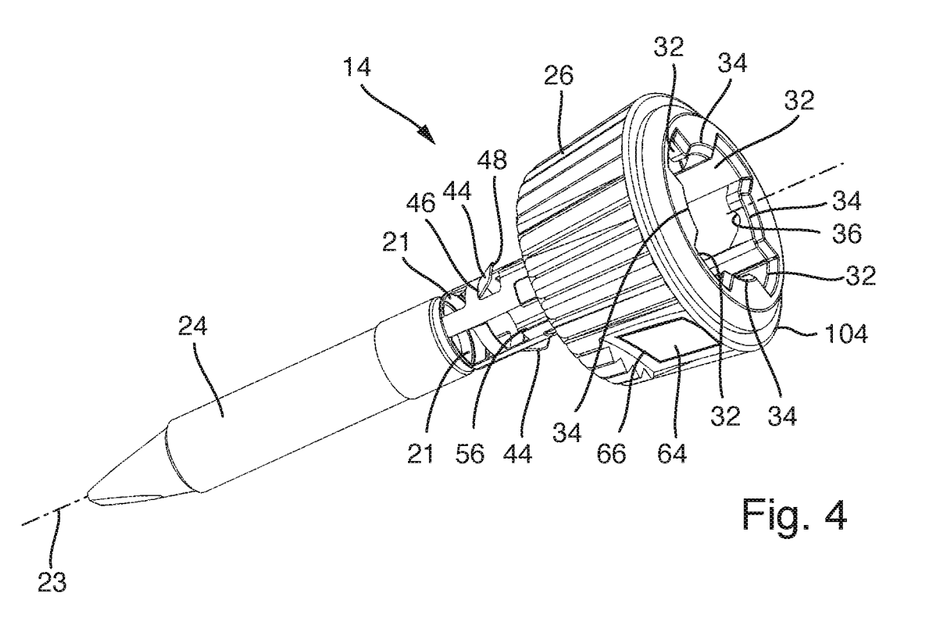
FIG. 4 shows the soldering tip assembly according to FIG. 2 in a view obliquely from the rear.
Figure 5:
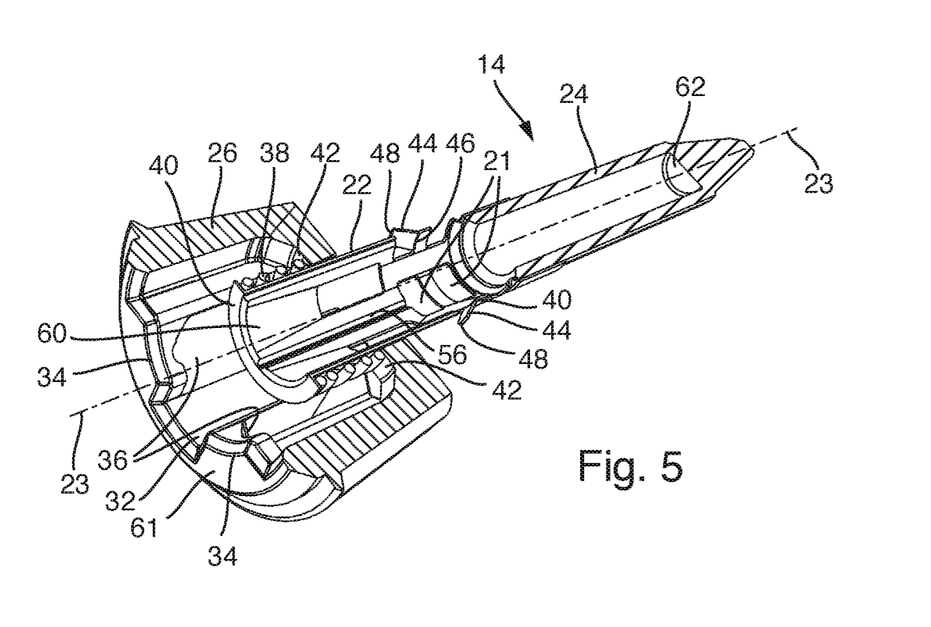
FIG. 5 shows a longitudinal section through the soldering tip assembly according to FIG. 4.

As is clear from FIGS. 4 and 5, which show the soldering tip assembly 14 with the soldering tip 24 deflected in the distal direction, the holding element 26 has four recesses 32 on its proximal face into which recesses the counter portions 28 can be introduced in the axial direction. A rear grip portion 34 projecting inward in the radial direction is provided between every two recesses 32. On the distal face thereof, the rear grip portions 34 have contact portions 36 which are used to receive the counter portions 28 or the latching lugs 30 thereof. The contact portions 36 are designed to be complementary to the latching lugs 30 such that they can come to rest in the contact portions 36 in a defined and secure manner.

It is clear from the section according to FIG. 5 that the soldering tip assembly 14 also has a spring element 38 next to the soldering tip 24, the sleeve 22 and the holding element 26. The spring element 38 is arranged between the sleeve 22 and the holding element 26 such that it pushes the holding element 26 away from the handheld portion 16 in the distal direction. The spring element 38 is designed as a coil spring and surrounds the sleeve 22. At the proximal end of the sleeve 22, the sleeve has an opening 60 and a flange portion 40 which protrudes in the radial direction and against which the spring element 38 acts. Opposite the flange portion 40, the holding element 26 has a proximal inner face 42 that faces the flange portion 40 and surrounds the sleeve 22 and against which the spring element 38 also acts. The spring element 38 is arranged and pre-tensioned such that, as already described, it pushes the holding element 26 on the sleeve 22 in the distal direction.

In order to arrange the holding element 26—which is in particular formed integrally and in particular is made of plastics material—captively on the sleeve 22, the sleeve has stop means 44 which prevent the possibility of the sleeve 22 including the soldering tip 24 from being removed from the holding element 26 in the proximal direction. As is clear in particular from FIGS. 4 and 5, two opposite stop means 44 are provided which project beyond the sleeve 22 in the radial direction. The stop means 44 are formed integrally with the sleeve and are produced as hook-out tongues. For this purpose, a bending point 46 is provided at the relative tongue foot, along which the stop means 44 are bent outward in the radial direction. The free ends 48 of the stop means 44 face the holding element 26.

Figure 6:
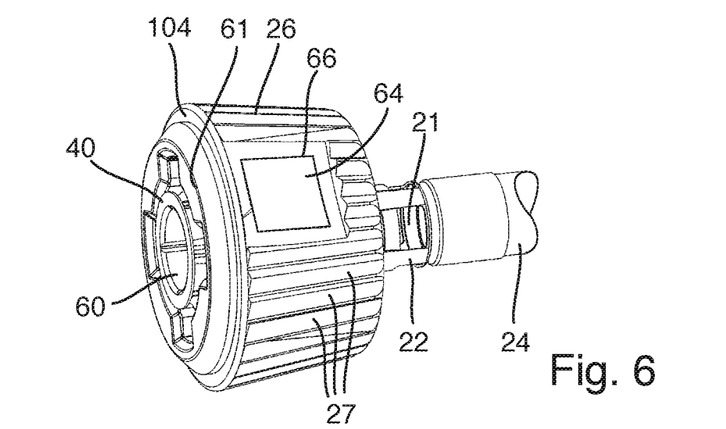
FIG. 6 is a view of the holding element of the soldering tip assembly obliquely from the rear.
Figure 7:
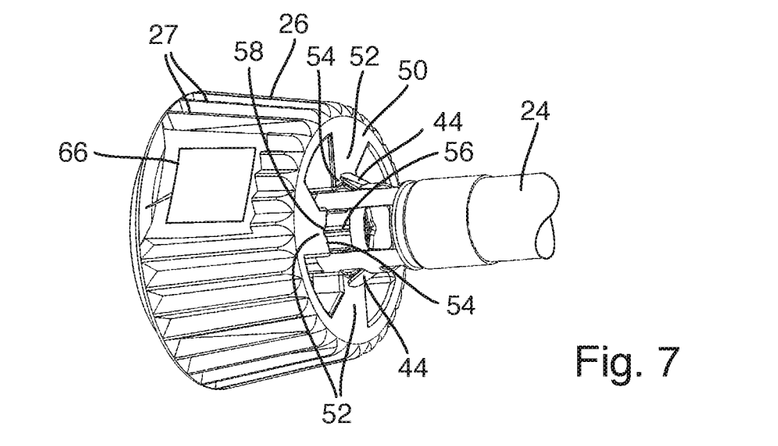
FIG. 7 is a view of the holding element of the soldering tip assembly obliquely from the front.

FIGS. 6 and 7 show the soldering tip assembly 14, wherein the free ends 48 of the stop means 44 come to rest here against the distal end face 50 of the holding element 26 due to the spring force. The end face 50 of the holding element 26 provides radially inwardly projecting shoulders 52, of which the free ends 54 are used to axially guide the sleeve. The free ends 48 of the stop means 44 come to rest on the distal upper face of the shoulders 52; the end face 50 or the shoulders 52 thus form a stop limit. As is also clear from FIG. 7, the sleeve 22 has guide contours extending in the axial direction in the form of beads 56, which are visible in particular in FIGS. 5 and 7. Complementary to the beads 56, recesses 58 extending in the radial direction are provided at the free ends 54 of the shoulders 52.

This has the advantage that the holding element 26 cannot rotate with respect to the sleeve 22 and thus a rotation of the soldering tip 24 is prevented. This is important, especially in the case of soldering tasks in which the soldering tip has to be held at a certain angle. A further advantage is that the free ends 48 of the stop means 44 are reliably supported on the shoulders 52.

As is clear in particular from FIGS. 5 and 6, in the non-mounted neutral state of the soldering tip assembly 14, the flange portion 40 rests with the opening 60 in the same plane as the proximal face 61 of the holding element 26. This has the advantage that the holding element 26 is largely protected when the free end of the heating element 18 is introduced. It would also be conceivable that the opening 60 with the flange portion 40 projects beyond the holding element 26 in the proximal direction.

Figure 8:
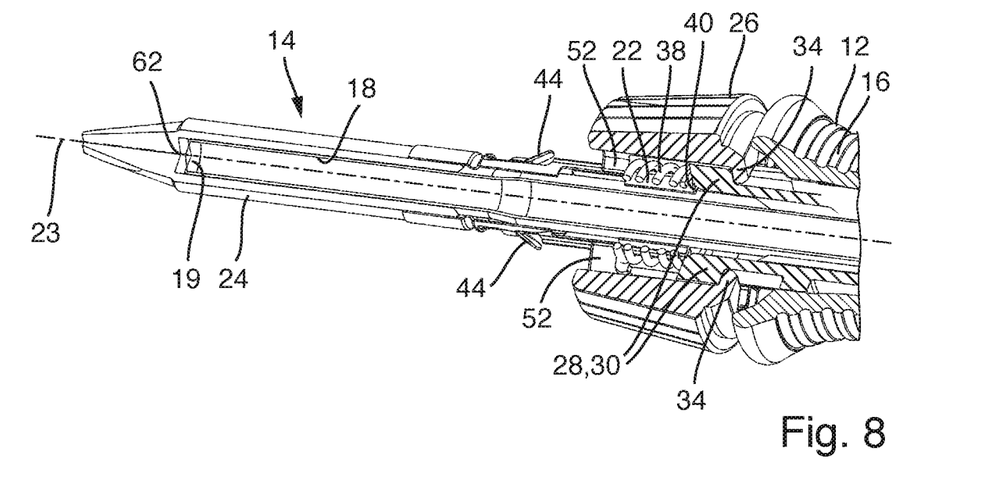
FIG. 8 shows a section through a soldering tip assembly arranged on the handle.

FIG. 8 shows the soldering tip assembly 14 mounted on the handle 12. In order to secure the soldering tip assembly 14 on the handle, the rear grip portions 34 are struck in the distal direction by the spring force of the spring element 38 against the counter portions 28 having the latching lugs 30.

The soldering tip assembly is mounted on the handle 12 as follows:

First, the free end 19 of the heating element 18 is introduced into the opening 60 of the sleeve 22. The heating element 18 is introduced into the sleeve 22 and then into the soldering tip 24 until the free end 19 of the heating element 18 acts against an stop portion 62 provided in the soldering tip 24. As is clear from FIGS. 5 and 8, the soldering tip 24 is formed like a blind hole and has the stop portion 62 at its bottom. Because the free end 19 of the heating element 18 acts against the stop portion 62, the soldering tip 24 is pushed in the distal direction against the force of the spring element 38 when the heating element 18 is moved further in the distal direction. Consequently, the holding element 26 is moved against the spring action relative to the soldering tip 24 or to the heating element 18 along the longitudinal axis 23. At the same time, the counter portions 28 enter the recesses 32 on the holding element 26. Thereafter, the holding element 26 is rotated relative to the heating element 24 about the longitudinal axis 23 such that the counter portions 28 or the lugs 30 thereof come to rest against the rear grip portions 34. In the mounting position, the latching lugs 30 are then pushed against the contact portions 36 due to the spring force of the spring element 38. As a result, the spring element 38 has the effect that the free end 19 of the heating element is pushed—for functionally reliable heat conduction and, where appropriate, also temperature measurement—against the stop portion 62 of the soldering tip 24, and that the counter portions 28 with the latching lugs 30 come to rest securely in the contact portions 36 of the holding element 26.

As is clear from FIGS. 1, 2, 4 6 and 7, a coding 64 in the form of a two-dimensional code is provided on the holding element 26. The coding 64 is such that it can be read with a reading device and the soldering tip 24 used in each case or soldering tip assembly 14 can be identified. The holding element 26 has, on its radial circumference, a radially recessed surface 66 on which the coding 64 is provided. As a result, the coding 64 is reliably protected in particular against damage or abrasion. The coding can in particular be a bar code or QR code printed with pad printing. It is also conceivable to provide an RFID chip or tags as coding.

Figure 9:
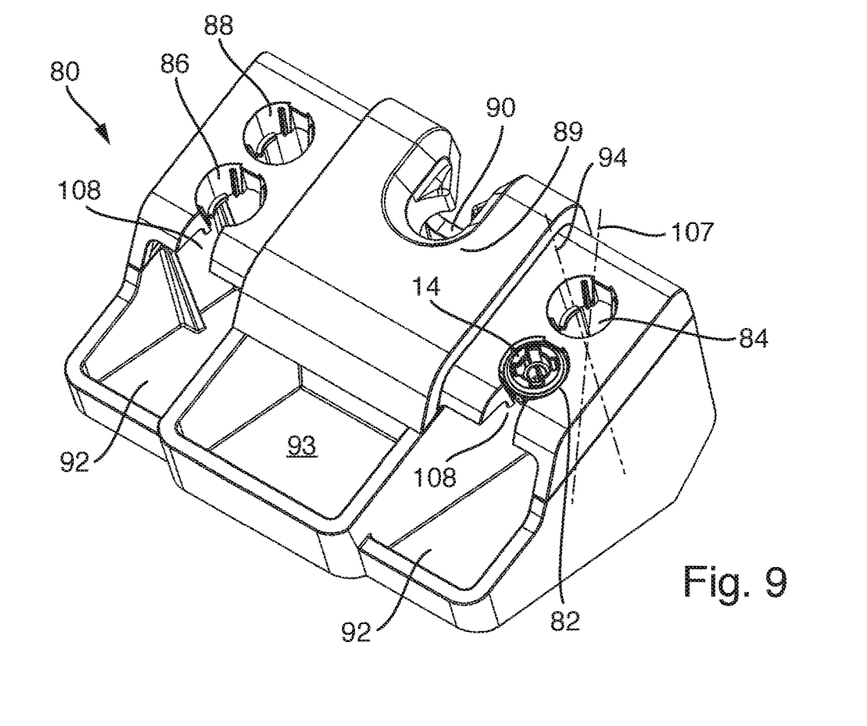
FIG. 9 shows a deposit stand for a soldering tip assembly.
Figure 10:
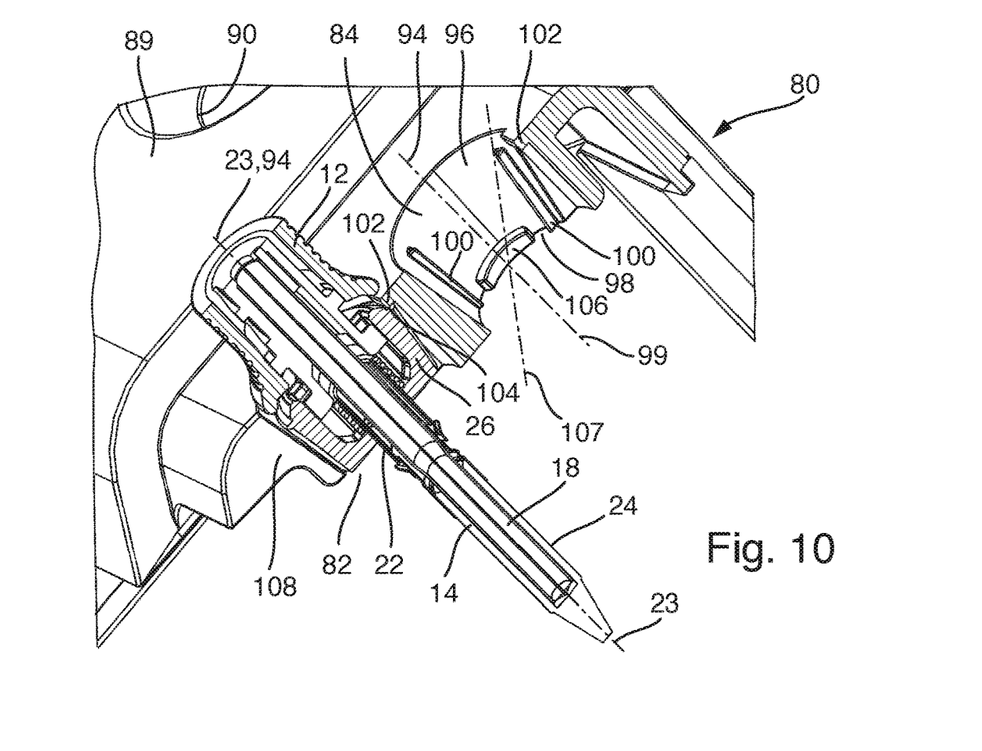
FIG. 10 shows a section through the deposit stand according to FIG. 9 with a soldering tip assembly.

FIGS. 9 and 10 show a deposit stand 80 for depositing the soldering device 10 and for depositing various soldering tip assemblies 14. The deposit stand is designed to be deposited on a planar surface, in particular a table. The deposit stand 80 shown has a total of four funnel-shaped change holders 82, 84, 86 and 88 on its upper face, wherein a soldering tip assembly 14 is provided in the change holder 82. Furthermore, a soldering device receptacle 90 in which the soldering device 10 can be deposited is provided in a central region 89. The change holders 82, 84, 86 and 88 are provided laterally next to the soldering device receptacle 90. The deposit stand 80 further comprises, on its face facing the operator, receiving compartments 92 for receiving small parts and accessory parts as well as a shelf 93 for soldering tips.

As is clear in particular from FIG. 10, the change holders 82, 84, 82, 88 are each designed to taper conically about an introduction axis 94 in the distal direction. The cone of the change holders 82, 84, 82, 88 is designed so as to be at least partially complementary to the cone of the holding element 26 such that the relevant soldering tip assembly 14 securely comes to rest in a change holder 82, 84, 86, 88 with its holding portion 26. The change holders 82, 84, 86, 88 have an introduction opening 96 on the proximal upper face thereof and a bottom opening 98 on the distal bottom face thereof. The introduction opening 96 is elongate or oval and the bottom opening 98 is round such that a pivoting between the introduction layer and a removal layer is possible. Overall, the diameter of the introduction opening 96 is greater than the diameter of the bottom opening 98, resulting in the conical design.

As is clear in particular from the section according to FIG. 10, anti-rotation elements 100 in the form of ribs are provided on the inner surface of the change holders 82, 84, 86, 88, and are located in planes extending through the introduction axis 94. It is conceivable that one rib or a plurality ribs are provided in each case. The anti-rotation elements 100 are formed so as to protrude in the radial direction toward the introduction axis 94. The anti-rotation elements 100 are also designed such that they interact with the parallel knurls provided on the relevant holding element 26 or engage between two knurled projections 27 to secure the holding element 26 against rotation. However, the anti-rotation elements are also conceivable in orthogonal arrangement with respect to the axis 94, for example on the surface of the introduction stop 106.

A soldering tip assembly 14 introduced into a change holder 82, 84, 86 and 88 is thereby held in the deposit stand 80 so as not to rotate. By providing the total of four change holders 82, 84, 86 and 88 shown in FIG. 9, a total of four different soldering tip assemblies 14 can consequently remain in the change holders 82, 84, 86 and 88 shown there.

It is also clear from the section according to FIG. 10 that a retaining element 102 is provided in the region of the relevant introduction opening 96, which retaining element is used to retain a soldering tip assembly 14 introduced into the respective change holders 82, 84, 86, 88 and pivoted into a removal position during the proximal removal of the handle 12. The relevant retaining element 102 engages behind an annular shoulder 104 provided on the holding element 26 in the removal position such that the holding element 26, and thus the soldering tip assembly 14, remains securely in the deposit stand 80 when the handle is removed in the proximal direction. The retaining element 102 is designed as a projection which is formed so as to protrude in the radial direction toward the introduction axis 94. In order to be able to move the soldering tip assembly 14 with the annular shoulder 104 under the retaining element 102, the change holders 82, 84, 86, 88 are formed in an oval shape on the introduction opening. The soldering tip assembly can thus be pivoted or tilted from the introduction axis 94 toward a removal axis 107. It is also conceivable for the retaining elements 102 to have a conditional elastic resilience. With the retaining element 102, the soldering tip assembly 14 can be securely detached from the handle with the heating element, in particular in the event of a possible adhesion of the soldering tip 24 to the heating element 18. However, if a soldering tip assembly 14 fastened to the handle 12 is to be removed from the relevant change holder 82 to 88, this can take place along the axis 94 without damaging the holding element 26 and/or the retaining element 102.

As is further apparent from the section according to FIG. 10, introduction stops 106 are provided in the region of the bottom opening 98. The introduction stops 106 allow the distal faces of the relevant holding element 26 to rest against the proximal upper face of the relevant introduction stop 106. It can thereby be achieved that the holding element 26 does not become jammed in the change holder.

The introduction stops 106 are formed as projections which are formed so as to protrude in the radial direction toward the introduction axis 94. The design is further such that the holding element 26 can be pivoted or tilted on the surface of the introduction stop 106 between the two axes 94 and 107. The relevant introduction stop 106 is designed here such that the anti-rotation elements 100 are in engagement with the parallel knurling 27 at any time when the holding element 26 is tilted between the axes 94 and 107, and a rotation of the holding element is thus prevented during the entire tilting movement.

The two change holders 82 and 86 are designed to be open at the edges and have a lateral opening 108 for laterally introducing or removing soldering tip assemblies 14. As a result, soldering tip assemblies 14, which have a soldering tip and the dimensions of which are greater than the diameter of the bottom opening 98, can also be introduced in the change holders 82 and 86.

By providing the change holders 82 to 88 shown in FIGS. 9 and 10, a change of a soldering tip assembly 14 can consequently be performed in a simple manner. A soldering tip assembly 14 arranged on the handle 12 is introduced into a change holder 82, 84, 86 or 88 along the axis 94 until the distal face of the holding element 26 comes to rest against the proximal upper face of the introduction stops 106. In addition, at least one of the anti-rotation elements 100 engages in the parallel knurling 27 provided on the holding element 26 such that the holding element 26 is arranged in a rotationally secure manner in the relevant change holder 82. If the handle 12 is then actuated further in the distal direction against the spring force of the spring element 34, the counter portions 28 or the latching lugs 30 thereof disengage from the contact portions 36. To release the bayonet-type fastening of the soldering tip assembly 14 on the handle 12, the handle 12 is rotated relative to the soldering tip assembly 14 until the handle-side counter portions 28 go into the holding-element-side recesses 32 and the handle 12 together with the heating element 18 can be removed from the soldering tip assembly 14 in the proximal direction. Then, if the heating element 18 is to adhere to the soldering tip 24, the handle 12 can be pivoted or tilted starting from the axis 94 about a pivot point 99 toward the axis 107 until the retaining element 102, as shown in FIG. 10, engages behind the holding element 26 or its annular shoulder 104. As a result, the relevant retaining element 102 securely retains the soldering tip assembly 14 in the relevant change holder 82 to 88, and undesired removal from the relevant change holder 82 to 88 is prevented.

If a different soldering tip assembly 14 is to be fastened to the handle 12, the heating element 18 can be introduced into the opening 60 of a sleeve 22 of a soldering tip assembly 14, which sleeve is deposited on the deposit stand 80. The introduction has to be carried out in such a way that the counter portions 28 provided on the handle 12 engage in the recesses 32 provided on the holding element 26. After the spring force of the spring element 38 is overcome, the handle 12 is rotated relative to the relevant holding element 26 such that the latching lugs 30 of the counter portions 28 engage with the contact portions 36 of the rear grip portions 34 such that the soldering tip assembly 14 is fastened to the handle 12 in a bayonet-like manner.

After the latching lugs 30 have come to rest against the contact portions 36, the handle 12 together with the selected soldering tip assembly 14 can be guided out of the relevant change holder 82 to 88 in the proximal direction. It is then guided out along the axis 94.

The described change of the soldering tip assembly 14 has the advantage that the change can be done without manual contact of the holding element 26, and thus without a risk of burning on the holding element 26. The operator only has the handle 12 of the soldering device 100 in hand; the soldering tip assemblies 14 can be securely accommodated in the respective change holders 82 to 88.

Furthermore, the reading device for reading the coding 66 provided on the relevant soldering tip 14 can be arranged in or on the deposit stand 80. After the soldering tip assembly 14 has been changed, the relevant holding element 26 with the coding 64 can be guided past the reading device such that the relevant soldering tip assembly 14 or the associated soldering tip 24 can be identified. In an alternative embodiment, a reading device for an RFID chip or tag is installed in the deposit stand in order to thus provide a message about the soldering tip used directly when the soldering tip assembly 14 is received or changed.

The invention claimed is:

1. Soldering tip assembly for an electric soldering device, the soldering tip assembly being configured to be releasably arranged on a soldering device handle which has a heating element,
    the soldering tip assembly having a sleeve which extends around a longitudinal axis and having a soldering tip provided on a distal end of the sleeve,
    the sleeve having an opening at a proximal end for introducing the heating element, and
    the soldering tip assembly having a holding element which at least partially surrounds the sleeve in an annular manner and a spring element which is provided between the holding element and the sleeve and pushes the holding element in a distal direction, wherein the sleeve has at least one stopper arranged distally from the spring element, said stopper securing the holding element against the soldering tip assembly in the distal direction.

2. Soldering tip assembly according to claim 1, characterized in that the at least one stopper projects beyond the sleeve in a radial direction.

3. Soldering tip assembly according to claim 1, characterized in that the at least means stopper is designed as a hook-out tongue formed integrally with the sleeve.

4. Soldering tip assembly according to claim 1, characterized in that the holding element is formed in one piece.

5. Soldering tip assembly according to claim 1, characterized in that the holding element has a distal end face which is used to stop the stopper and is thus used as a stop limit of the sleeve.

6. Soldering tip assembly according to claim 1, characterized in that the holding element has a distal end face having a proximal inner face on which one end of the spring element is supported.

7. Soldering tip assembly according to claim 1, characterized in that the opening of the sleeve is in a same plane as a proximal face of the holding element or in that the opening of the sleeve projects beyond this plane in a proximal direction.

8. Soldering tip assembly according to claim 1, characterized in that the spring element is designed as a coil spring surrounding the sleeve, and in that the sleeve has a flange portion which protrudes in the radial direction at the proximal end and against which one end of the spring element acts.

9. Soldering tip assembly according to claim 1, characterized in that, in order to axially guide the holding element, the sleeve has at least one guide contour and in that the holding element has at least one counter contour designed complementary thereto.

10. Soldering tip assembly according to claim 1, characterized in that the soldering tip assembly is fastened to the handle by a bayonet-type fastening in such a way that the handle can be rotated relative to the soldering tip assembly and is removable relative to the proximal direction in order to release the soldering tip assembly.

11. Soldering tip assembly according to claim 1, characterized in that the holding element has a proximal face and a distal face, wherein the holding element has recesses on the proximal face and has rear grip portions between the recesses, which portions provide contact portion on the distal face thereof for resting against counter portions provided on the handle.

12. Soldering tip assembly according to claim 1, characterized in that a coding which can be read by a reading device is provided on the holding element for identifying the soldering tip assembly.

13. Soldering tip assembly according to claim 12, characterized in that the holding element has a radially recessed surface on which the coding is provided.

14. Electric soldering device, comprising
    a soldering tip assembly being configured to be releasably arranged on a soldering device handle which has a heating element with a distal end,
    the soldering tip assembly having a sleeve with a distal end and a proximal end, wherein the sleeve extends around a longitudinal axis and having a soldering tip provided on the distal end of the sleeve, the sleeve having an opening at the proximal end for introducing the heating element, and the soldering tip assembly having a holding element which at least partially surrounds the sleeve in an annular manner and a spring element which is provided between the holding element and the sleeve and pushes the holding element in a distal direction, wherein the sleeve has at least one stopper arranged distally from the spring element, said stopper securing the holding element against the soldering tip assembly in the distal direction, the electric soldering device comprising a handle with a distal end and a proximal end, wherein the handle has a rod-shaped heating element on its distal end and a handheld portion on its proximal end, such that the distal end of the heating element can be introduced into the opening of the sleeve.

15. Soldering device according to claim 14, characterized in that the handle between the heating element and the handheld portion has counter portions which interact with the rear grip portions in such a way that, in the mounted state, the spring element strikes the holding element against the counter portions such that the free end of the heating element is pushed against a stop portion of the soldering tip.

16. Soldering system comprising a. a soldering device comprising a soldering tip assembly, the soldering tip assembly being configured to be releasably arranged on a soldering device handle which has a heating element, the soldering tip assembly having a sleeve with a distal end and a proximal end, wherein the sleeve extends around a longitudinal axis and having a soldering tip provided on the distal end of the sleeve, the sleeve having an opening at the proximal end for introducing the heating element, and the soldering tip assembly having a holding element which at least partially surrounds the sleeve in an annular manner and a spring element which is provided between the holding element and the sleeve and pushes the holding element in a distal direction, wherein the sleeve has at least one stopper arranged distally from the spring element, said stopper securing the holding element against the soldering tip assembly in the distal direction, the electric soldering device comprising a handle with a distal end and a proximal end, wherein the handle has a rod-shaped heating element on its distal end and a handheld portion on its proximal end, such that the distal end of the heating element can be introduced into the opening of the sleeve, and b. a deposit stand for depositing and removing the soldering tip assembly from the handle.

17. Soldering system according to claim 16, characterized in that the deposit stand has at least one change holder which is designed to be at least partially complementary to the holding element such that a soldering tip assembly arranged on the handle can be introduced into the change holders along an axis, and which has an anti-rotation element which interacts with the holding element.

* * * * *